US 8,244,700 B2
*Aug. 14, 2012

(12) United States Patent
Permandla et al.

(10) Patent No.: US 8,244,700 B2
(45) Date of Patent: *Aug. 14, 2012

(54) RAPID UPDATE OF INDEX METADATA

(75) Inventors: Pratibha Permandla, Bellevue, WA (US); Yinzhe Yu, Bellevue, WA (US); Guarav Sareen, Sammamish, WA (US); Abhas Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 167 days.

This patent is subject to a terminal disclaimer.

(21) Appl. No.: 12/705,207

(22) Filed: Feb. 12, 2010

(65) Prior Publication Data

US 2011/0202541 A1    Aug. 18, 2011

(51) Int. Cl.
*G06F 7/00* (2006.01)
*G06F 17/00* (2006.01)
*G06F 17/30* (2006.01)

(52) U.S. Cl. .................... 707/696; 707/711; 707/739

(58) Field of Classification Search .................. 707/5, 7, 707/711, 705, 742
See application file for complete search history.

(56) References Cited

U.S. PATENT DOCUMENTS

| | | | |
|---|---|---|---|
| 6,070,158 A | 5/2000 | Kirsch | |
| 6,931,397 B1 | 8/2005 | Sundaresan | |
| 6,990,498 B2 | 1/2006 | Fenton | |
| 7,080,064 B2 * | 7/2006 | Sundaresan | 1/1 |
| 7,165,071 B2 | 1/2007 | Fanning | |
| 7,299,404 B2 | 11/2007 | Agarwal | |
| 7,469,257 B2 | 12/2008 | Parlin | |
| 7,689,574 B2 * | 3/2010 | Chen et al. | 707/715 |
| 2004/0088649 A1 | 5/2004 | Elder et al. | |
| 2004/0205044 A1 | 10/2004 | Su et al. | |
| 2006/0059144 A1 | 3/2006 | Canright et al. | |
| 2006/0106793 A1 * | 5/2006 | Liang | 707/5 |
| 2007/0198506 A1 * | 8/2007 | Attaran Rezaei et al. | 707/5 |
| 2007/0239530 A1 | 10/2007 | Datar et al. | |
| 2007/0276829 A1 * | 11/2007 | Wang et al. | 707/7 |
| 2008/0010238 A1 | 1/2008 | Whyte | |
| 2008/0168035 A1 | 7/2008 | Ross | |
| 2009/0157729 A1 | 6/2009 | Herlocker | |

(Continued)

OTHER PUBLICATIONS

Lipyeow Lim, et al., "Dynamic Maintenance of Web Indexes Using Landmarks", 10 pages, IBM T.J. Watson Research Center, WWW2003, May 20-24, 2003, Budapest, Hungary.

(Continued)

*Primary Examiner* — Susan Chen
(74) *Attorney, Agent, or Firm* — Shook Hardy & Bacon LLP

(57) ABSTRACT

Systems and methods for performing an updating process to an in-memory index are provided. Upon receiving notice of document modifications covered by an inverted index associated with a search engine, in the form of an update file, a representation of the modification is published onto various index serving machines. Each index serving machine receiving the update file determines if the modifications are applicable to the index serving machine. If an index serving machine determines that it contains mapping information corresponding to the modified documents, the index serving machine utilizes the update file and associated mapping information to update an in-memory index. In embodiments, the in-memory index is used to provide results to user queries in tandem with the inverted index. In some embodiments, an extra in-memory index is maintained that is revised with constantly incoming metadata updates and the existing in-memory index is periodically swapped with the revised in-memory index.

17 Claims, 6 Drawing Sheets

U.S. PATENT DOCUMENTS

| | | | |
|---|---|---|---|
| 2009/0164437 | A1 | 6/2009 | Torbjornsen |
| 2010/0241647 | A1 | 9/2010 | Ntoulas et al. |
| 2011/0004588 | A1* | 1/2011 | Leitersdorf et al. .......... 707/711 |
| 2011/0196855 | A1* | 8/2011 | Wable et al. ................. 707/711 |

OTHER PUBLICATIONS

A W Leung, et al., "High-performance metadata indexing and search in petascale data storage systems", 5 pages, SciDAC 2008, IOP Publishing, Journal of Physics: Conference Series 125 (2008) 012069.

Christopher D. Manning, et al., "An Introduction to Information Retrieval", 581 pages, Online edition Apr. 1, 2009, Cambridge University Press, http://www.informationretrieval.org; http://nlp.stanford.edu/IR-book/pdf/irbookonlinereading.pdf.

Dong, et al., "Towards Recency Ranking in Web Search", Proceedings of the third ACM international conference on Web search and data mining, Feb. 4-6, 2010, 10 pages.

Moon, et al., "Online Learning for Recency Search Ranking Using Real-time User Feedback", 19th ACM International Conference on Information and Knowledge and Management, Oct. 26-30, 2010, 4 pages.

"The Inner Workings ora Realtime Search Engine, Retrieved on Oct. 4, 2010, Available at:http://blog.oneriot.com/content/2009/06/the-inner-workings-of-a-realtime-search-engine/".

Nie, et al., "Incorporating Trust into Web Search", Technical Report LU-CSE-06-034, Department of Computer Science and Engineering, Lehigh University, Bethlehem, PA, 18015, Dec. 2006, 25 pages.

Non Final Office Action of U.S. Appl. No. 13/169,807, mailed Dec. 14, 2011.

* cited by examiner

RAPID UPDATE OF INDEX METADATA

BACKGROUND

Often, indexes are utilized to facilitate effective navigation of the web. These indexes are frequently updated in accordance with changes to content of documents (e.g., web pages) that are within the scope of the index. In instances, web crawlers are employed to browse these documents at predetermined time intervals to discover the changes to the content. Typically, the entire index is replaced each time the web crawler finds a change to content of a document, no matter how insignificant. Replacing the index usually involves pulling the index offline for an extended period and performing a full merge of the index. Additionally, while the subject index is offline several replicate indexes need to be created and relied upon to serve users when the subject index is down. Performing a full merge frequently (e.g., daily) is prohibitively expensive as it consumes a large amount of computing resources. Accordingly, indexes are not updated often enough to effectively track the changes to the content of the documents within their scope.

Because current solutions for updating an index to correspond with the content of the tracked documents, or other data, incur a substantial delay prior to updating, recent changes to terms of a web page (e.g., prices appended to items for online sale), or updates to other structured data (e.g., documents of various formats, non-web sources) are not reflected by the index. These shortcomings of the delayed updating are exaggerated when the index is expansive in size, covering a multitude of documents stored at a multitude of websites.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for, among other things, rapidly updating metadata in a search index (e.g., inverted index for searching documents associated with websites) by recording changes to content within documents that are searchable by the inverted index in an in-memory index. Initially, upon receiving an update file indicating that a modification has occurred to the content of one or more documents associated with an inverted index, the update file may be published to several index serving devices. After filtering out the relevant update information from the update file, an index serving device may extract an identifier of the documents that were modified and ascertain a relative position of the modified content within the documents. The update file, identifier of the documents, and the relative position of the modified content may be utilized to update an in-memory index. The in-memory index contains representations of metadata underlying the modified content of the documents associated with the main inverted index.

The in-memory index may be continuously updated with metadata updates. In embodiments, the in-memory index may be utilized in conjunction with the main inverted index to serve query results in response to user-queries. Further, upon receiving a user query, query results from the in-memory index (containing the most recent updates to metadata associated with the inverted index) and query results from the inverted index (generated by web crawling and building of documents) may be merged and returned to the user.

BRIEF DESCRIPTION OF THE DRAWINGS

Embodiments of the present invention are described in detail below with reference to the attached drawing figures, wherein.

DETAILED DESCRIPTION

Figure 1:
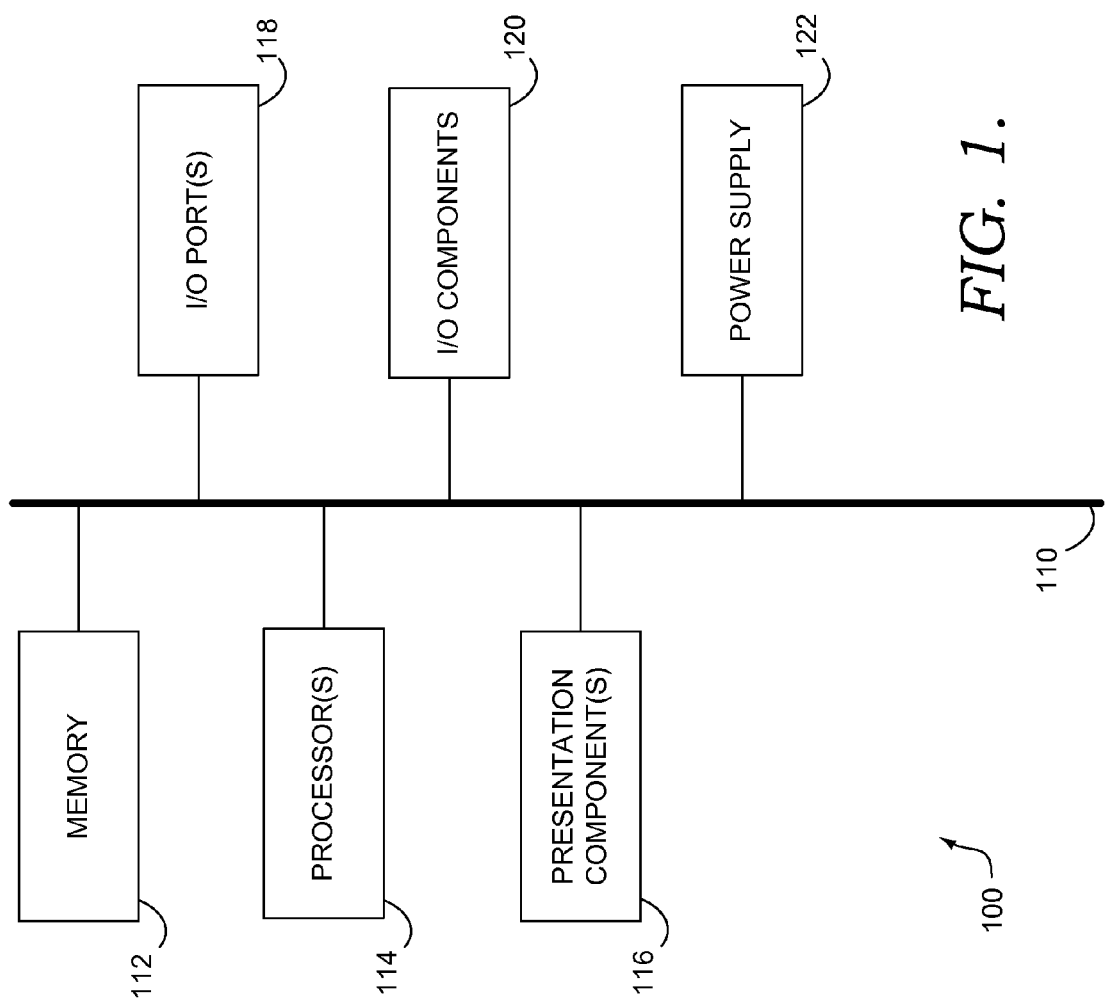
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention relates to systems, methods, and computer readable media for rapidly updating metadata in an inverted index by recording changes to content within documents that are searchable by the main inverted index in an in-memory index.

Accordingly, in one aspect, the present invention provides one or more computer storage media storing computer-useable instructions that, when used by one or more computing devices, cause the one or more computing devices to perform a method. The method includes receiving an update file, the update file providing an indication that a modification has occurred to the content of one or more documents associated with an inverted index. The method also includes publishing the update file to in-memory index managers located on a plurality of index serving devices, the in-memory index managers are configured for initiating an update process that applies the update file to a primary in-memory index. The update process includes, for each update file published to the in-memory index managers, determining whether each index serving device of the plurality of index serving devices contains mapping data corresponding to the update file. The update process also includes, for each index serving device containing mapping data corresponding to the update file, extracting from the update file a document identifier of the one or more documents associated with the modified content. The update process further includes, for each index serving device containing mapping data corresponding to the update file, ascertaining a position of the modified content utilizing an index object, the index object maintaining a structured record of a location of the content of one of the one or more documents associated with the inverted index. The update process still further includes utilizing the update file, the document identifier, and the position of the modified content, to update the primary in-memory index. The primary in-memory index is used to serve a set of query results in response to one or more user queries.

In another embodiment of the present invention, an aspect is directed to a computer system for performing an online update process. As more fully discussed below, the computer system includes a processing unit coupled to a computer storage medium, where the computer storage medium stores a plurality of computer software components executable by the processing unit. Some of the computer software components include a receiving component, a publishing component, an in-memory index manager, and an index-file manager. Generally, the receiving component is configured to receive an update file, the update file providing an indication that a modification has occurred to the content of one or more documents associated with an inverted index. The publishing component is configured to push the update file to one or more in-memory index managers located on a plurality of index serving devices. In embodiments, each of the plurality of index serving devices includes a filtering component configured to determine whether each index serving device contains mapping data corresponding to the published update file. Each in-memory index manager is configured to initiate an update process to a corresponding in-memory index, the in-memory index maintains a record of modifications to the one or more documents associated with an inverted index. The index-file manager is configured to serve a set of query results in response to a user query utilizing query results from both the in-memory index and the inverted index, the index-file manager merges query results from the in-memory index and the inverted index to generate the set of query results served in response to the user query.

In yet another aspect, the present invention provides one or more computer storage media storing computer-useable instructions that, when used by one or more computing devices, cause the one or more computing devices to perform a method. The method includes receiving a user query. The method also includes, extracting primary query results in response to the user query from an inverted index, the inverted index located on a plurality of index serving devices. In embodiments, the inverted index is updated by crawling a monitored set of documents within a predetermined scope of websites. The method also includes, determining that an in-memory index associated with the plurality of index serving devices contains secondary query results in response to the user query, the secondary query results containing recent updates to metadata underlying the content of one or more documents covered by the inverted index. The in-memory index is updated by an update process that includes receiving an update file that provides an indication that a modification has occurred to the content of one or more documents associated with the inverted index. The update process also includes, publishing the update file to in-memory index managers located on the plurality of index serving devices. The update process also includes, for each update file published to the in-memory index managers, determining whether each index serving device of the plurality of index serving devices contains mapping data corresponding to the update file. The update process also includes, for each index serving device containing mapping data corresponding to the update file, extracting from the update file a document identifier of the one or more documents associated with the modified content. The update process further includes, for each index serving device containing mapping data corresponding to the update file, ascertaining a position of the modified content utilizing an index object, the index object maintains a structured record of a location of the content of one of the one or more documents associated with the inverted index. The update process also includes utilizing the update file, the document identifier, and the relative position of the modified content, to update the in-memory index. The method also includes extracting the secondary query results from the in-memory index and merging the primary query results with the secondary query results. The method further includes presenting a set of query results responsive to the user query.

As used herein, the phrases "inverted index" and/or "main inverted index" are not meant to be limiting, but may encompass any form of index. In one instance, the inverted-index is an index that is generated by web crawling and the building of documents covered by the inverted index. As used, herein the phrase "in-memory" index is an index that maps the changed terms with the modified location and metadata in the index. The in-memory index may be stored via Random Access Memory (RAM); Read Only Memory (ROM); Electronically Erasable Programmable Read Only Memory (EEPROM); flash memory or other memory technologies. The in-memory index may also be implemented using storage means other than memory. In embodiments, each term in an inverted index may have metadata associated with it. For instance, a term "Price" might have metadata associated with it, where the metadata indicates the price of an object. Accordingly, the in-memory index organizes and stores new updated metadata. Thus, where the price of an object in an inverted index changes, the in-memory index organizes and temporarily stores in-memory the updated price metadata.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as component programs, being executed by a computer or other machine, such as a personal data assistant or other handheld device. Generally, component programs including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
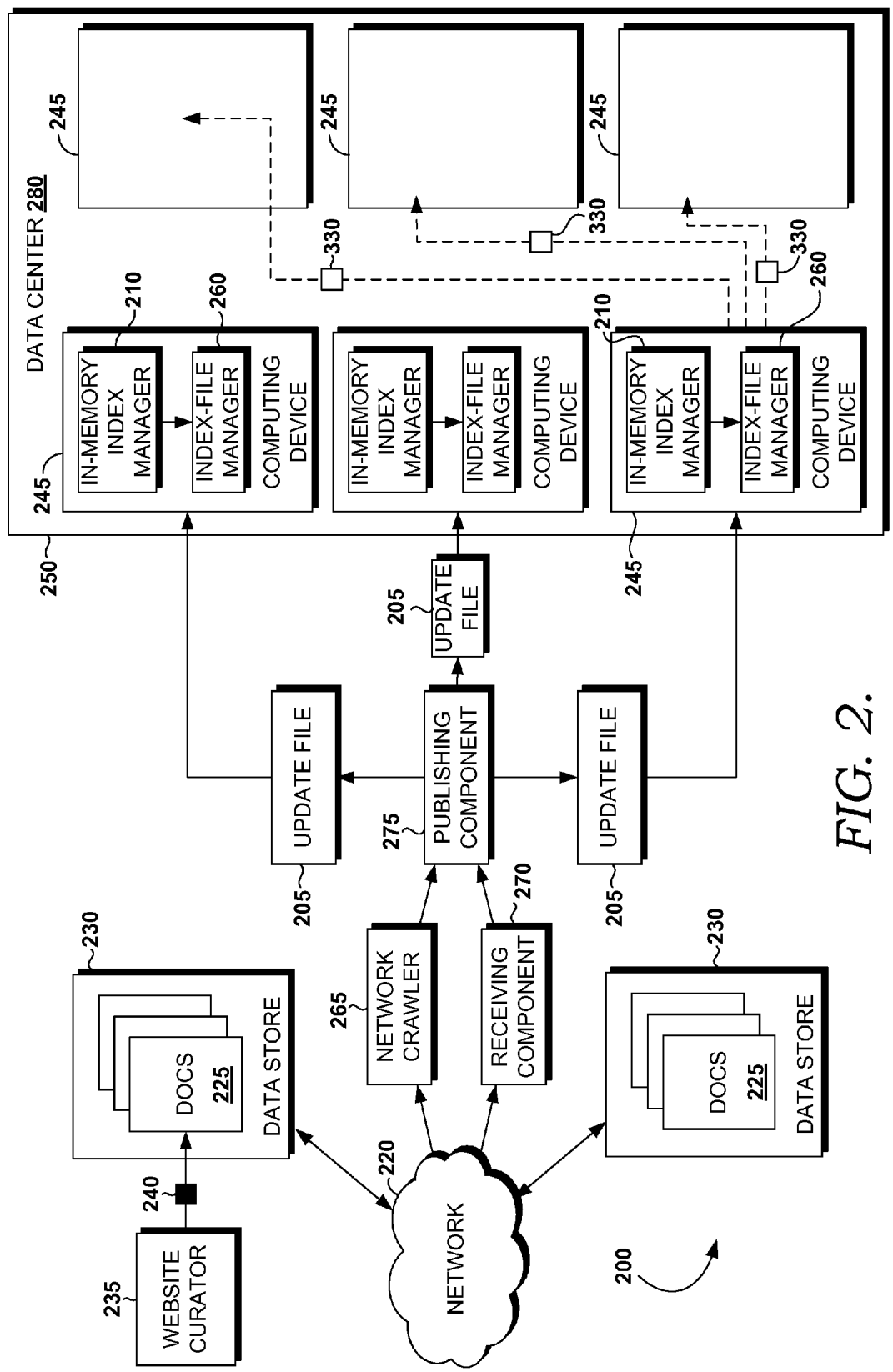
FIG. 2 is a block diagram of an exemplary system according to an embodiment of the present invention.

Turning now to FIG. 2, a block diagram is illustrated, in accordance with an embodiment of the present invention, showing a system 200 configured to generate an updated in-memory index. It will be understood and appreciated by those of ordinary skill in the art that the system 200 shown in FIG. 2 is merely an example of one suitable computing system environment and is not intended to suggest any limitation as to the scope of use or functionality of embodiments of the present invention. Neither should the system 200 be interpreted as having any dependency or requirement related to any single component or combination of components illustrated therein. Further, the system 200 may be provided as a stand-alone product, as part of a software development environment, or any combination thereof.

The system 200 includes one or more user computing devices 245 within a data center 280, a network crawler 265, a receiving component 270, a publishing component 275, and one or more data stores 230, all in communication with one another. Generally, components (e.g., network crawler 265, receiving component 270, publishing component 275) of the exemplary system 200 may be interconnected by any method known in the relevant field. In embodiments, a network 220 is provided to facilitate communication between the data stores 230 and the computing devices 245 of the data center 280. For instance, the data stores 230 and the data center 280 may be operably coupled via the network 220 comprising a distributed communications environment. In one example, the network 220 may be wireless and may include, without limitation, one or more local area networks (LANs) and/or wide area networks (WANs). Such networking environments are commonplace in offices, enterprise-wide computer networks, intranets, and the Internet. In addition, many more components (e.g., BTSs, devices, and the like) may be operably coupled to wireless network 220.

In yet other embodiments, the network 220 of FIG. 2 may couple components 210, 260, 265, 270 and 275, thereby forming a distributed computing environment where tasks are performed by remote-processing devices that are linked through appropriate connections. These connections may be established by wired technologies, wireless technologies, or a combination thereof. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.) that are different from the specific illustrated embodiments. Therefore it is emphasized that embodiments of the connections between components are not limited by the examples described, but embrace a wide variety of methods of communications.

The distributed computing environment of the exemplary system 200 includes the data center 280 configured to accommodate and support operation of the component programs 210, 260, and optionally 265, 270 and/or 275 utilizing one or more of the computing devices 245. It will be understood and appreciated by those of ordinary skill in the art that the data center 280 shown in FIG. 2 is merely an example of one suitable for accommodating one or more of the component programs and is not intended to suggest any limitation as to the scope of use or functionality of embodiments of the present invention. Neither should the data center 280 be interpreted as having any dependency or requirement related to any single component combination of components, resources (not shown), or set of APIs to access the resources (not shown). Further, although the various blocks of FIG. 2 are shown with lines for the sake of clarity, in reality, delineating various components is not so clear, and metaphorically, the lines would more accurately be grey and fuzzy.

Further, it should be noted that embodiments of the present invention are not limited to implementation on such physical resources (e.g., computing devices 245) illustrated in FIG. 2, but may be implemented on any of a variety of different types of computing devices, equipment, and component programs within the scope of embodiments hereof. In other words, illustrated computing device 245 of the data center 280 depict an exemplary configuration that is intended for discussion purposes only; accordingly, any suitable layout of computing devices, and instances of the component programs residing thereon, known in the computing industry may be used and is contemplated by the present invention.

Each of the computing devices 245 shown in FIG. 2 may be any type of computing device, such as, for example, computing device 100 described above with reference to FIG. 1. By way of example only and not limitation, each of the computing devices 245 may be a server, a personal computer, processing blade(s), server, desktop computer, laptop computer, handheld device, mobile handset, consumer electronic device, and the like. Additionally, the computing devices 245 may further include a keyboard, keypad, stylus, joystick, and any other input-initiating component that allows a user to access wired or wireless data on the network 220. It should be noted, however, that the present invention is not limited to implementation on such computing devices, but may be implemented on any of a variety of different types of computing devices within the scope of embodiments hereof.

In embodiments, each computer device 245 is an index serving machine (ISM) within an index serving bed. As such, each computer device 245 serves a portion of a search system index provided by the data center 280. In addition, each of the computing devices 245 may be provisioned with hardware that facilitates the reception of messages over the Internet supported by the network 220 and/or pathways within an intranet supported by the data center 280. These messages may include communications that are consistent with processing modifications to documents 225 maintained at the data stores 230 and/or updating an in-memory index with those modifications. The communications may be transmitted at the commencement or ending of establishing a connection, or at any time(s) therebetween. In addition, hardware is disposed on the computing device 245 capable of transmitting the messages at any rate, or at predefined periods of time.

Typically, the hardware is configured as, or is linked to, some form of a computing unit (e.g., central processing unit, microprocessor, etc.) to support operations of the component (s) running thereon. As utilized herein, the phrase "computing unit" generally refers to a dedicated computing device with processing power and storage memory, which supports operating software that underlies the execution of applications and computer programs installed thereon. In one instance, the computing unit is configured with tangible hardware elements, or machines, that are integral, or operably coupled, to each device that perform update-related processes (e.g., update process, merge process, and the like) and other operations. In another instance, the computing unit may encompass a processor coupled to the computer-readable medium accommodated by the computing devices 245. Generally, the computer-readable medium stores, at least temporarily, a plurality of computer software components (e.g., components 210, 260, 265, 270, and/or 275 of FIG. 2) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., saving an updated inverted index or in-memory index to the computer-readable memory).

Also, beyond processing instructions, the processor may transfer information to and from other resources (not shown) that are integral to, or disposed on, the data center 280. Generally, resources refer to software and hardware mechanisms that enable the data center 280 to perform a particular function. By way of example only, the resources may include one or more of the following mechanisms: imaging apparatuses (e.g., user-interface display); data stores; printing devices; paging systems; audio alert devices; and media-display units.

The data stores 230 are generally configured to store information associated with the documents 225. In various embodiments, documents 225 may include, without limitation, metadata, files (e.g., web page), folders, and/or data related to a website. As discussed herein, metadata may be any piece of information that describes a portion of one or more of the documents 225. For example, the language of one of the documents 225 may be metadata. Metadata, in general, is data that describes any type of information in the documents 225, such as a web page document. By way of example, a meta word is a word that describes an aspect of a document (e.g., a characteristic of a document, an element of a document, a term, a price, a character, a phrase, and the like). Further, meta words are sometimes not located or included within the documents 225, but may represent an element found within the documents 225 or a characteristic of that document. Other meta words may include, but are not limited to, language (e.g., language of a web document), location (e.g., country of origin of a web document), or type (e.g., type of a web document).

In addition, the data stores 230 may be configured to be searchable for suitable access of stored information. For instance, the data stores 230 may be searchable for one or more modifications 240, additions, or deletions associated with one or more of the documents 225. It will be understood and appreciated by those of ordinary skill in the art that the information stored in the data stores 230 may be configurable and may include any information relevant to the merged inverted index update process. The content and volume of such information are not intended to limit the scope of embodiments of the present invention in any way. Further, though illustrated as independent components, the data stores 230 may, in fact, be a plurality of databases, for instance, a database cluster, where portions of which may reside on one or more of the computing devices 245, a search engine (not shown), another external computing device, and/or any combination thereof.

Although frequently used herein, the phrase "web document" is not meant to limit the scope of the system 200 described herein. That is, the system 200 is not limited to indexing only web documents but also indexes documents of various other types ingested by other mechanisms. These documents might be provided by vendors or by automatic processes different from WWW (e.g., dumps of binary data, SQL data dumps, feeds, etc). Further, the updates to these documents might also be provided by different mechanisms.

As shown in FIG. 2, the exemplary system 200 includes various component programs such as the in-memory index manager 210, the index file manager 260, the network crawler 265, the receiving component 270 and the publishing component 275. In some embodiments, one or more of the illustrated components 210, 260, 265, 270 and 275 may be implemented as stand-alone applications. In other embodiments, one or more of the illustrated components 210, 260, 265, 270 and 275 may be integrated directly into the operating system of the data center 280, the data stores 230 and/or one or more of the computing devices 245. By way of example, the in-memory index manager 210 may be a sub-component of the index-file manager 260. It will be understood by those of ordinary skill in the art that the components 210, 260, 265, 270 and 275 illustrated in FIG. 2 are exemplary in nature and in number and should not be construed as limiting. Any number of components may be employed to achieve the desired functionality within the scope of embodiments of the present invention.

In operation, the components of the exemplary system 200 perform one or more of the functionalities discussed below. However, embodiments of the present invention are not limited to the specific functionalities described, and may include alternative processes that achieve the results that are attained by the following component functions. Initially, a modification 240 may be made to one or more of the documents 225 stored at one or more of the data stores 230. In one instance, the modification 240 may be applied to the content of the document(s) 225. This type of modification 240 typically involves a change initiated by a website curator 235, or any other entity that wields administrative control over the document(s) 225. By way of example, the modification 240 made to content of the document(s) 225 may involve altering at least one term within a web page posted online. For instance, the term may be a price value associated with an item for sale at a retail-based web page.

Although several different configurations of the modification 240 to the document(s) 225 have been described, it should be understood and appreciated by those of ordinary skill in the art that other types of suitable techniques (manually/automatically employed by entities that have rights to edit the document(s) 225) that result in altering any portion of the document(s) 225 (e.g., metadata underlying content and terms of the document(s) 225) may be used, and that embodiments of the present invention are not limited to those modifications 240 described herein.

The network crawler 265 is generally configured to discover and express the indication of the modification 240 to the document(s) 225 upon performing an examination procedure. Initially, the network crawler 265 may access the document(s) via the network 220. Alternatively, the network crawler 265 may be partially distributed onto one or more of the data stores 230, or may be a stand-alone element that remotely monitors the modifications 240 without reading the document(s) 225. In one instance, the examination procedure involves crawling the document(s) 225 within a monitored set of documents that fall within a predetermined scope of websites searchable via the inverted index. In another instance, the examination procedure involves detecting the modifications 240, such as an adjustment to metadata underlying the content of the document(s) 225 within the set of documents. Detecting the modifications 240 may be carried out utilizing any analytical process known to those of ordinary skill in the relevant field. By way of example, detecting may be accomplished by comparing a previous cached version of a document against the document(s) 225 currently maintained by the data stores 230 to discover and locate any inconsistencies. Further, the examination procedure performed by the network crawler 265 may be executed at regular intervals, at predefined periods of time, in a real-time fashion (e.g., triggered by the website curator 235 accessing and editing the content of the document(s) 225), or any other manner that promotes effective detection of the modifications 240.

Upon the network crawler 265 crawling the set of documents and performing the examination procedure thereto, the modification 240 may be detected. In an exemplary embodiment, upon detecting the modification 240 (e.g., recognizing that terms have changed in the website), the network crawler 265 may inform the publishing component 275 of the modification 240. In some embodiments, the network crawler may also indicate the relative position of the modification 240 within the document(s) 225 that received the change.

In another instance, a receiving component 270 may be configured to receive and express an indication of the modification 240 to the document(s) 225. For instance, in one embodiment, the receiving component may receive an update file from web site curator 235. The update file may provide an indication that a modification 240 has occurred to the content of the document(s) 225 of data store 230. Accordingly, receiving component 270 may receive an update file via network 220 without network crawler 265 crawling document(s) 225 in search of modification 240 to the content of the data store 230. Upon receiving an update file, the receiving component 270 may inform the publishing component 275 of the modification 240 (e.g., recognizing that terms have changed in the website).

Upon being informed of the modification 240, the publishing component 275 may notify in-memory index manager(s) 210 of the modification. In one instance, the publishing component 275 may send the received data regarding the modification 240 to each computing device 245 of the data center 280. By way of example, publishing component 275, may push update file 205 to each computing device 245 of data center 280.

The in-memory index manager(s) 210 may be located on computer device(s) 245. In an embodiment, each computer device 245 of the data center 280 includes an in-memory index manager 210 that facilitates updating an in-memory index of each respective computer device 245. In another embodiment in-memory index manger 210 may be a component of the index file manager 260, The in-memory index manager(s) 210 may initiate an update process that applies the modification 240 to an in-memory index. Updating the in-memory index on index serving device(s) 245 may involve various procedures that entail processing information related to the update file 205 and modification 240 into a format that may be applied to the in-memory index. In embodiments, the information includes the data (e.g., terms, content, underlying metadata, and the like) that is modified, characteristics of the modification 240 (e.g., relative position in the document(s) 225), and an identification of the document(s) 225 receiving the modification 240. In embodiments, the identification of the document(s) 225 may include one or more of the following: URL; web page address; location of the website of the data store 225; or the data associated with a source of the modification 240.

Upon receiving the published update file 205 from the publishing component 275, the in-memory index manager(s) 210 may initiate an update process that applies modifications of the published update file 205 to an in-memory index. The in-memory index managers(s) 210 may be installed on the computing devices 245 (e.g., index server machines (ISM's) within an index serving bed) of the data center 280. The update process may involve various procedures that involve packaging the information related to the modification 240 into a format that may be applied to an in-memory index (see reference numeral 330 of FIG. 3). In embodiments, the information includes the data (e.g., terms, content, underlying metadata, and the like) that is modified, characteristics of the modification 240 (e.g., relative position in the document(s) 225, version of a modified document), and an identification of the document(s) 225 receiving the modification 240.

Initially, the update process may involve determining whether the computer devices 245 receiving published update file 205, contain mapping data corresponding to published update file 205. In particular, each computer device 245 serves a portion of a global index provided by the data center 280. Accordingly, the update process for a given computer device 245 involves determining whether a received update file 205 applies to the portion of the global index served by the computer device 245. In embodiments, the published update file 205 may include data consisting of a URL and the changes to terms and/or related metadata associated with the altered document(s) 225. Upon receiving the published update file 205, the in-memory index manager 210 may initiate a filtering process to determine if modification(s) contained in the update file 205 apply to the portion of the index served by the corresponding computer device 245. The filtration step may involve the in-memory index manager 210 of the computer device 245 comparing the URL of a document indicated as modified by the published update file 205 with URLs associated with mapping data stored on the computer device 245. Traditional systems and methods for updating index metadata typically involve a publishing manager that partitions the data received from an update file and distributes the respective portions of data pertinent to particular index server machines. The data portioning at the publishing manager can create a bottle neck in the update system and hamper the rapid delivery of update data. In embodiments, publishing component 275 may publish update file 205 to all index serving devices 245 of data center 280, however only those computer devices 245 that serve data associated with the published update file 205 may proceed with further processing of the update file 205 beyond the filtration step. By utilizing the several ISMs 245 to do the partitioning of the update data in parallel, the time from publishing the updates to reflecting the updates in the inverted index may be reduced. The update process may further include, for each computer device 245 containing mapping data corresponding the update file 205, extracting from the update file 205 a document identifier of the altered document(s) 225. In embodiments, the identification of the document(s) 225 may include one or more of the following: URL; web page address; location of the website of the data store 225; or the data associated with a source of the modification 240.

The update process may even further include, determining the relative position of the modification 240 within the content of the document(s) 225 (e.g., posted web page), using an index object. An index object may maintain a structured record of a location of the content of document(s) 225 in data store 230. In one instance, in-memory index manager 210 of the computer device 245 may access an independent service and/or an internal scheme that maintains an up-to-date mapping schedule that matches the URL or the web page address of the altered document(s) 225 with a unique identifier of the associated document(s) 225. As such, the mapping schedule may be used to transcribe the URL or web page address associated with the published update file into the appropriate document identifier. This document identifier, along with the relative position of the modified content may be utilized along with the information from the update file 205 to update the in-memory index.

In embodiments, upon deciphering the web page address or URL of the altered document(s) 225 from the identifier, the update process may further include utilizing the web page address or URL to derive an absolute location of the modified content within the monitored set of documents from the relative position of the modification 240. This absolute location (global within the set of documents) of the modification 240 may be saved, at least temporarily, to the in-memory index. In other embodiments, saving data to the in-memory index may involve the modifications 240 transported by the update files 205 being entered to the in-memory index as updated content, terms, or metadata coupled with an absolute located of the content, terms, or metadata.

The format of the in-memory index may be substantially similar to that of the inverted index. However, the in-memory index format is populated with aspects of just those terms that have changed (delta information). In one instance, the aspects of the terms that are populated into the format of the in-memory index utilizing update file 205 include the identification of the altered document(s) 225, characteristics of the modification 240 (e.g., new underlying metadata), and where (e.g., relative position) the modification 240 occurred within the document(s) 225. Although a specific set of data (e.g., update file 205) associated with the modification 240 is utilized for creating an entry within the in-memory index, discussed in the exemplary embodiment above, one of ordinary skill in the relevant field would appreciate and understand that other data sets that describe and locate the modification 240 to the contents of data store 225 may be used.

Figure 3:
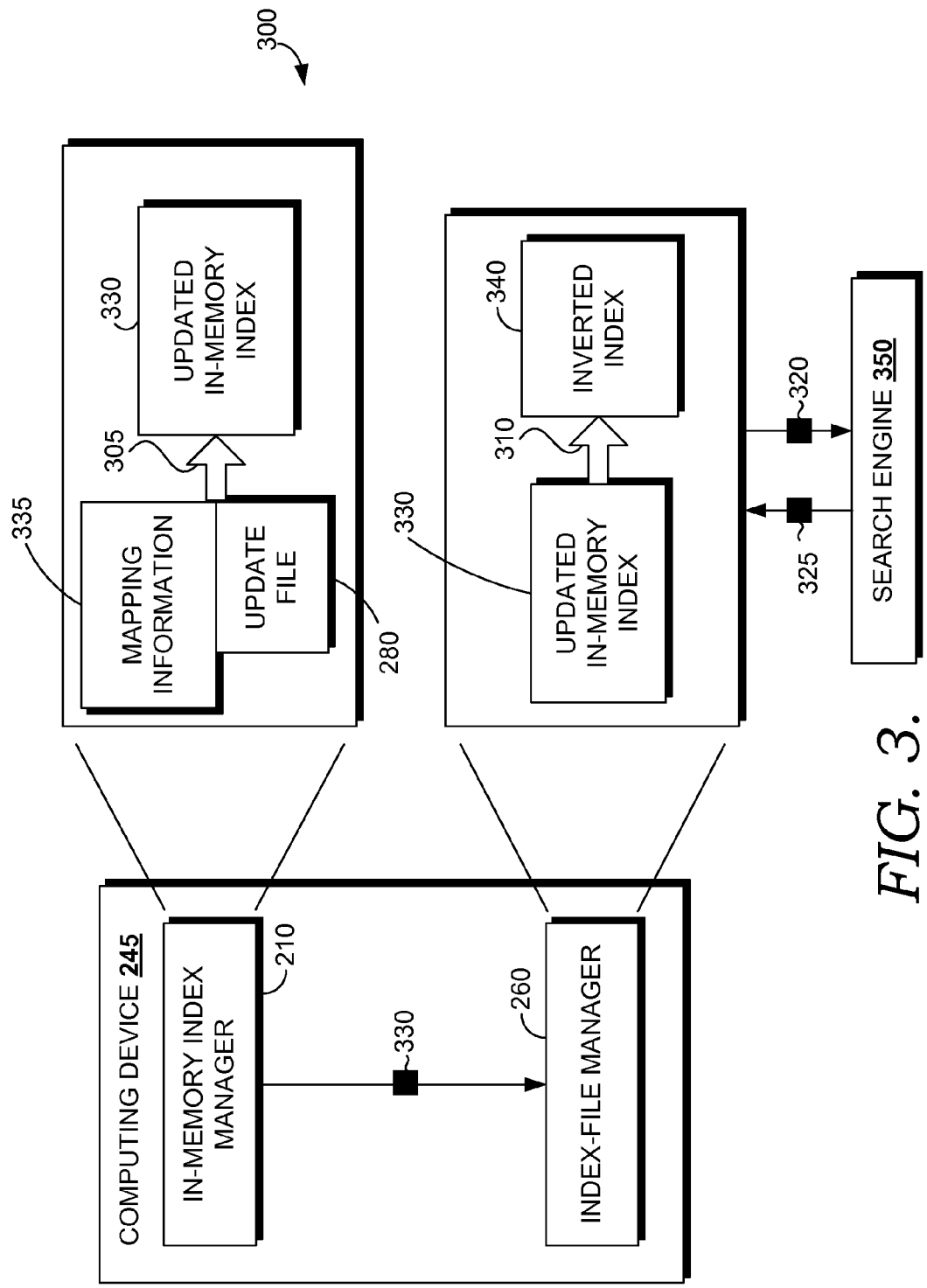
FIG. 3 is a block diagram of an exemplary computing device for executing an update process in accordance with an embodiment of the present invention.

With reference to FIG. 3, an embodiment of the update process 305 will now be discussed. In general, FIG. 3 depicts a block diagram 300 that illustrates an exemplary computing device 245 for executing the update process 305 in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As depicted, the in-memory index manager 210 utilizes mapping information 335 stored on computer device 245 and information extracted from published update file 205 to arrive at an updated in-memory index 330. The update process 305 may be implemented in real-time upon receiving a update file 205 from the publishing component 275, at a recurring time frame, or at any other predefined time period. The updated in-memory index 330 may be submitted to the index-file manager 260. Upon receiving the updated in-memory index 330, the index-file manager 260 may perform an association process 310 that is generally designed to group the updated in-memory index 330 with the existing inverted index 340 for the purposes of searching.

In embodiments, the updated in-memory index 330 is generated, as discussed above, upon applying to the updated in-memory index 330 just those recent modifications to the set of documents, such as updated metadata, associated with the inverted index 340. Because, the entire inverted index 340 is not replaced, and because only updated information is stored in the updated in-memory index 330, which in many cases may be a very small portion of the entire inverted index 340, the update process 305 is an intelligent operation that conserves processing time and resources. By utilizing mapping information 335 distributed across several computer devices 245, notification of a change to the meta-data of the documents may be rapidly published to several computer devices 245 without processing the meta data updates to determine the computer device 245 responsible for serving the data associated with the update. In one embodiment, the computer device(s) 245 may filter relevant information from the published update file(s) 205. As such, by distributing the update files without doing significant pre-publication processing, to a large number of machines, a faster turn around for reflecting updated meta data in the inverted index will be achieved.

Accordingly, the update process 305 of embodiments of the present invention may be invoked more frequently, in addition to more frequent association 310 of the updated in-memory index 330 with the inverted index 340. Utilizing the updated in-memory index 330 in tandem with the inverted index 340 thereby provides an up-to-date updated search index that is responsive to, and reflective of, changes to the set of document associated with inverted index 340.

In an exemplary implementation, the update process 305 may be configured for updating the corresponding meta words in the updated in-memory index 330 with the associated document identifications and associated data, such as the meta word values and the locations for the meta words. In this implementation, a particular meta word may be located in the updated in-memory index 330 that requires updating by using the location information, as discussed above. The update process 305 may recursively locate each meta word that has associated updated information. In other instances, the update process may involve generating a new in-memory index containing the updated meta words and remove pointers to the obsolete in-memory index. As such, the association process 310 of the updated in-memory index 330 with the inverted index 340 would involve the newly generated in-memory index 330 and not the obsolete in-memory index. As such, embodiments of the present invention do not replace the entire inverted index 340 with new information, but may update any number of meta words at one time by generating an updated in-memory index 330. For example, one meta word may be updated in the in-memory index 330, while the other information in the inverted index 340 may not change.

Turning back to FIG. 2, in embodiments, the index-file manager 260 is designed to implement the association process 310 at regular intervals (e.g., hourly, daily, weekly, etc.) or in real-time upon the index-file manager 260 becoming aware of the updated in-memory index 330. In embodiments, the index-file manager 260 is designed to implement the association of the inverted index with the updated in-memory index upon receiving a search query related to data in the in-memory index. As such, it should be understood that the update process and the association process may be linked in implementation, or may be triggered independently. Upon completion of the update process, the updated in-memory index 330 is created. The updated in-memory index 330 may be conveyed to other in-memory index managers 210 that are disparately located throughout the data center 280. These locations in the data center 280 may correspond to rows of machines where each row has a complete copy of the inverted index.

In embodiments, the in-memory index managers 210 are provided to load the in-memory index 330 within one or more of the plurality of computing devices 245 upon receiving a published update file 205. In embodiments, the in-memory index manager 210 is installed on at least one of the plurality of computing devices 245 (e.g., rows of machines). In embodiments, the in-memory index manager 210 is configured to preserve web-search functionality of computing device 245 by keeping the ISM machine online when replacing portions of the in-memory index. In embodiments, an extra in-memory index which is updated with constantly incoming metadata updates is maintained. In other words, a computer device 245 may maintain two in-memory indices. An existing in-memory index is used to serve data in response to user queries while an updated in-memory index is updated with incoming updates. Periodically, incident to the association process 310, the updated in-memory index replaces the already existing in-memory index that is being served in tandem with the inverted index. That is, conducting the update process, as described herein, allows for frequently amending the in-memory index without taking the serving machine offline. As such, updates to metadata (e.g., prices, discounts of products) associated with content covered by the inverted index will be seen by users within minutes. In another embodiment of the update process, the updated in-memory index is loaded alongside the existing inverted index. In this embodiment, during a user-initiated search, the updated in-memory index takes preference over existing inverted index.

As discussed herein, the phrase "inverted index" is not to be construed as limiting and may encompass an arrangement of items that is searchable with a query and generally utilized to discover content related, in some aspect, to the query. In one instance, the inverted index is organized as an index that is searchable for content within the monitored set of documents upon receiving a query from a user. In this instance, similar to the index of a book, the inverted index lists each meta word received. For each meta word received, the inverted index may list each document identification that is associated with that meta word. In addition to listing each associated document identification, associated data may also be listed for each meta word.

With reference to FIG. 3, upon attaining the updated in-memory index 330, the set of documents within the scope of the inverted index 340 may be efficiently searched for content utilizing the updated in-memory index 330 in association with the inverted index 340, in that order. That is, recent changes to the set of documents are expediently incorporated into the updated in-memory index 330. Accordingly, a user-initiated online search via a search engine 350, which is operably coupled to the updated in-memory index 330 and the inverted index 340, will generally produce current search results (e.g., most recent price value associated with sale items). In one embodiment of an online search, the search engine 350 will communicate a query 325 for specific information contained in one or more of the documents to the updated in-memory index 330 then the inverted index 340 that, in turn, provides search results 320 that reflect the updated metadata.

The size of the updated in-memory index may be controlled by periodically (e.g., hourly, daily, weekly, etc.) reconstructing the main inverted index 340. By way of example, the inverted index 340 associated with computing devices 245 may be regenerated by performing a daily index merge of the inverted index 340, which may involve re-crawling the documents covered by the inverted index. Upon reconstructing the main inverted index, the accumulated updates of the in-memory index 330 may be re-processed because of changes to the documents associated with the inverted index 340. During this re-construction of the in memory index, older metadata update data may be discarded and the in-memory index size may be reduced.

Figure 4:
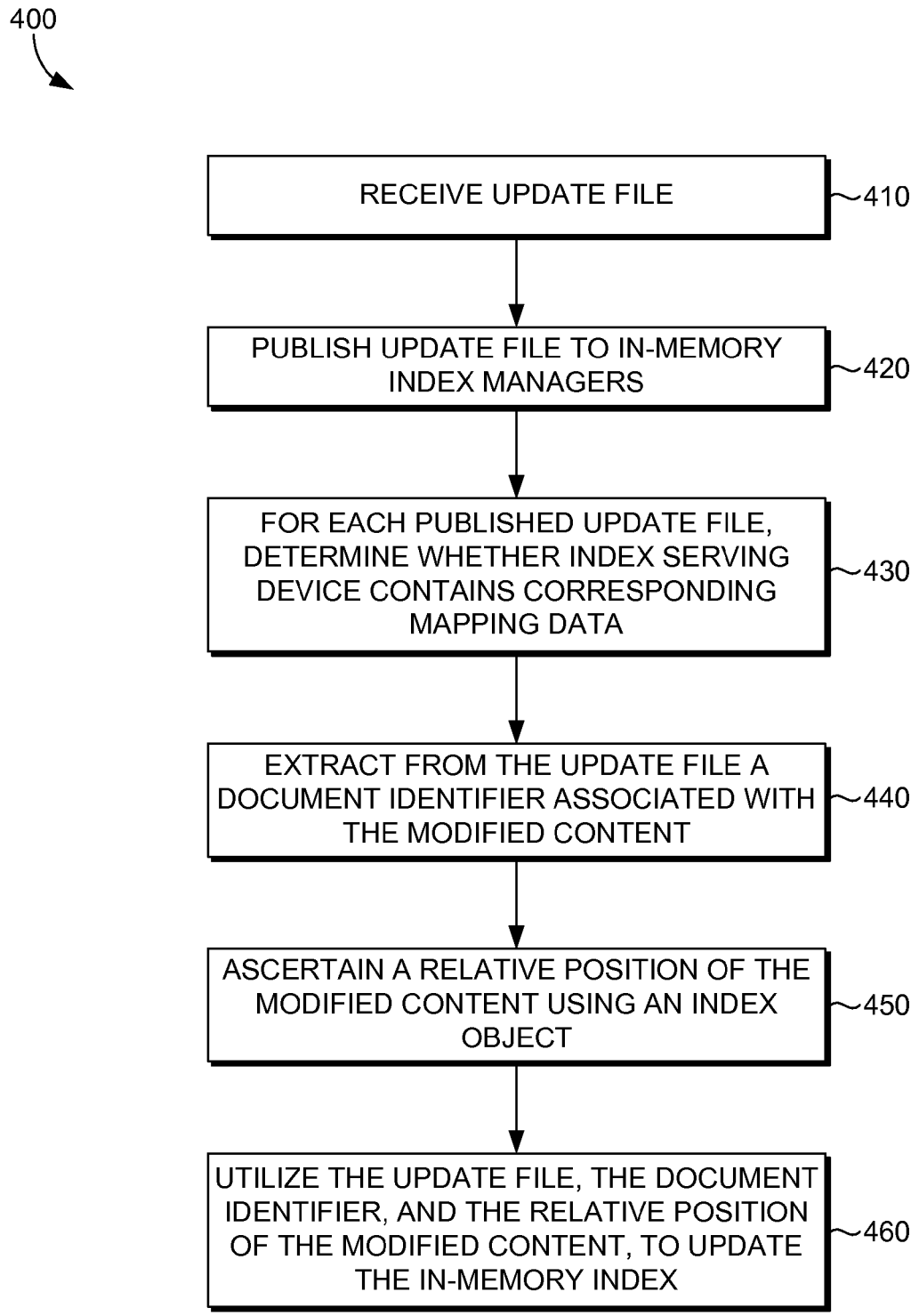
FIG. 4 is a block diagram of an overall method in accordance with an embodiment of the present invention.

Referring now to FIG. 4, a flow diagram is provided that illustrates a method 400 for updating an in-memory index in accordance with an embodiment of the present invention. Initially, as shown at block 410, an update file is received as input for in-memory index update purposes. The update file may be received from a website curator via a file cloud. The update file may be represented as having a key/data file format. The key file may be a text file with URLs and offsets. The offset may comprise the offset of the data for a particular URL in a data file. The update file may also include a wrapper file with a header, the header encapsulating both the key and the data file. The header of the wrapped file of the update file may contain metadata for the source content associated with the update (e.g., meta word, meta stream). The update file is published to in-memory index managers located on one or more ISMs, as shown at block 420. For each update file published to the in-memory index managers, it is determined whether the ISM device receiving the update file contains mapping data corresponding to the update file, as shown at block 430. Determining whether mapping information corresponding to the update file may be based on a comparison of the header of the update file with the mapping data on the ISM machine. The mapping data may be in the form of an index object containing seenURL chunks, where the seenURL chunks comprise the mapping of a particular URL to a unique document identifier. The document identifier may be used to determine the real location of the documents in the inverted index. An identifier associated with update file, and a representation of the metadata underlying modifications to the documents associated with the inverted index is extracted from the updated file, as shown at block 440. As previously discussed, the identifier may include a URL. Additionally, as shown at block 450, the relative position of the modified content may be obtained by joining the update files with the index object containing seenURL chunks. The update file, document identifier, and the relative position of the modified content may be used to update the in-memory index, as shown at block 460. Updating the in-memory index may include converting the update file's representation of metadata underlying the modifications, (e.g., URL, time stamp, data) and the document identification mapping information into a format similar to that of the inverted index.

Figure 5:
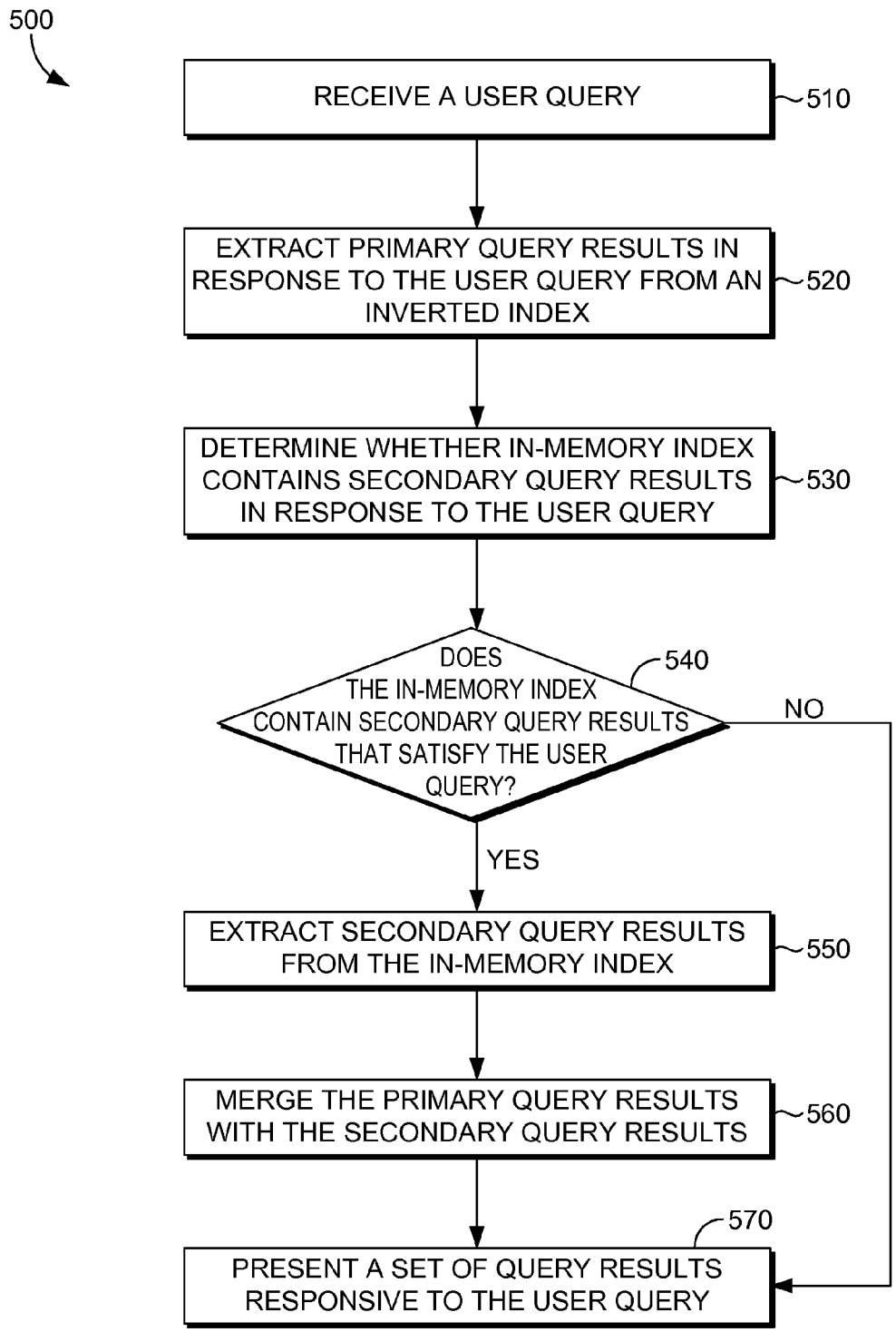
FIG. 5 is a flow diagram of an overall method for updating an in-memory index accordance with an embodiment of the present invention.

With reference now to FIG. 5, a flow diagram is provided that illustrates a method 500 for providing search results using an inverted index and update in-memory index in accordance with an embodiment of the present invention. As shown at block 510, a user query is received as an input. The user query may be a query for specific information contained in one or more of the documents associated with the inverted index. In response to the user query, primary search results in response to the user query are extracted from an inverted index, as shown at block 520. As shown at block 530, a determination is made regarding whether the in-memory index associated with the inverted index contains secondary query results responsive to user query. Secondary query results obtained from the in-memory index contain the most recent updates to the metadata underlying the content of documents covered by the inverted index. The in-memory index may be updated as previously described.

If it is determined at block 540, that the in-memory index does contain query results responsive to the user query, the secondary query results are extracted from the in-memory index, as shown at block 550. The secondary and primary query results from the in-memory index and inverted index respectively are merged, as shown at block 560. In this embodiment, because the secondary query results contain the most recent updates to the metadata underlying the documents being searched, where the secondary and primary query results overlap, the secondary query results from the in-memory index take preference over primary query results from the inverted index. For instance, the secondary query results may correspond to an updated price of a product in the primary query results. Accordingly, the updated price in the secondary query results are used in the merged data as opposed to the outdated price from the primary query results. The merged set of query results responsive to the user query are presented to a user, as shown at block 570.

If it is determined at block 540 that the in-memory index does not contain query results responsive to the user query, the primary query results from the inverted index are presented, as shown at block 570.

Figure 6:
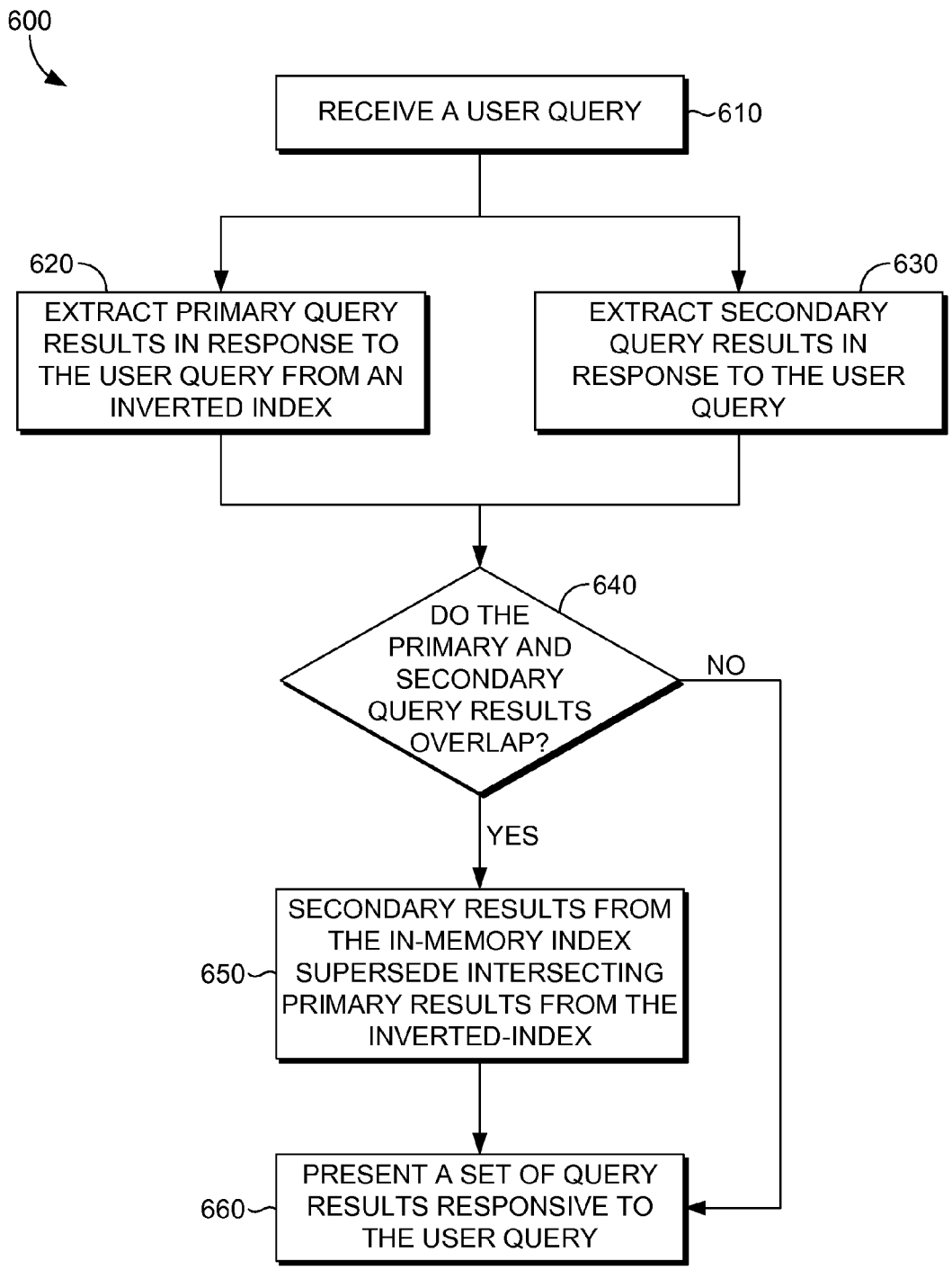
FIG. 6 is a flow diagram of another overall method for updating an in-memory index accordance with an embodiment of the present invention.

With reference now to FIG. 6, a flow diagram is provided that illustrates an additional method 600 for providing search results using an inverted index and update in-memory index in accordance with an embodiment of the present invention. As shown at block 610, a user query is received as an input. The user query may be sent in parallel to the main inverted index and to the in-memory index. In response to the user query, primary search results in response to the user query are extracted from an inverted index, as shown at block 620. Secondary search results in response to the user query are extracted from the in-memory index, as shown at block 630. As shown at block 640, a determination is made regarding whether there is an overlap of the search results from the main inverted index and the in-memory index.

If it is determined at block 640, that the primary search results from the main inverted index and the secondary search results from the in-memory index overlap or intersect, the secondary results from the in-memory index supersede the primary search results from the main inverted index, as shown at block 650. In this embodiment, because the secondary query results contain the most recent updates to the metadata underlying the documents being searched, where the secondary and primary query results overlap, the secondary query results from the in-memory index take preference over primary query results from the inverted index. A set of query results responsive to the user query are presented, as shown at block 660.

If it is determined at block 640, that the primary search results from the main inverted index and the secondary search results from the in-memory index overlap or intersect, a set of query results responsive to the user query are presented, as shown at block 660. The set of query results responsive to the user query may contain solely primary query results from the inverted index. As can be understood, embodiments of the present invention provide systems and methods for updating an in-memory index. The present invention has been described in relation to particular embodiments, which are intended in all respects to be illustrative rather than restrictive. Alternative embodiments will become apparent to those of ordinary skill the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims

What is claimed is:

1. One or more computer storage media storing computer-useable instructions that, when used by one or more computing devices, cause the one or more computing devices to perform a method comprising:
   receiving an update file, wherein the update file provides an indication that a modification has occurred to the content of one or more documents associated with an inverted index; and
   publishing the update file to in-memory index managers located on a plurality of index serving devices, wherein the in-memory index managers are configured for initiating an update process that applies the update file to a primary in-memory index;

wherein the update process comprises:
  for each update file published to the in-memory index managers, determining whether each index serving device of the plurality of index serving devices contains mapping data corresponding to the update file;
  for each index serving device containing mapping data corresponding to the update file, extracting from the update file a document identifier of the one or more documents associated with the modified content;
  for each index serving device containing mapping data corresponding to the update file, ascertaining a position of the modified content utilizing an index object, wherein the index object maintains a structured record of a location of the content of one of the one or more documents associated with the inverted index;
  referencing a mapping schedule residing on the index serving device upon receiving the update file;
  utilizing the mapping schedule to translate the document identifier of the one or more documents to a web page address;
  utilizing the update file, the document identifier, and the position of the modified content, to update the primary in-memory index, wherein the primary in-memory index is used to serve a set of query results in response to one or more user queries.

2. The one or more computer storage media of claim 1, wherein the modification occurring to the content of the one or more documents involves a curator-initiated change to at least one term within a web page posted online.

3. The one or more computer storage media of claim 2, wherein the update process further comprises determining the position of the at least one modified term within the content of the posted web page.

4. The one or more computer storage media of claim 1, wherein the update process further comprises:
  generating a metadata update, wherein the metadata update comprises a representation of metadata underlying the modified content.

5. The one or more computer storage media of claim 4, wherein the update process further comprises:
  storing the metadata update in a secondary in-memory index, wherein the secondary in-memory index is continuously altered with meta data updates.

6. The one or more computer storage media of claim 5, wherein the update process further comprises:
  updating the primary in-memory index in an on-line fashion by periodically replacing the primary in-memory index with the secondary in-memory index to generate an updated primary in-memory index.

7. The one or more computer storage media of claim 6, wherein the index serving machine serves a set of query results in response to one or more user queries utilizing results from both the updated primary in-memory index and the inverted index.

8. The one or more computer storage media of claim 1, wherein the in-memory index managers are configured to initiate the update process at pre-determined periodic time frame.

9. The one or more computer storage media of claim 1, wherein the in-memory index managers are configured to initiate the update process in real-time.

10. A computer system for performing an online update process, the computer system comprising a processing unit coupled to a computer storage medium, the computer storage medium having stored thereon a plurality of computer software components executable by the processing unit, the computer software components comprising:
  a receiving component for receiving an update file, wherein the update file provides an indication that a modification has occurred to the content of one or more documents associated with an inverted index;
  a publishing component for pushing the update file to one or more in-memory index managers located on a plurality of index serving devices, each of the plurality of index serving devices comprising a filtering component for determining whether each index serving device contains mapping data corresponding to the published update file;
  each in-memory index manager configured to initiate an update process to a corresponding in-memory index, wherein the update process comprises:
    for each update file published to the in-memory index manager, extracting an identifier of the one or more documents associated with the modified content;
    referencing a mapping schedule residing on the index serving device upon receiving the update file from the publishing component; and
    utilizing the mapping schedule to translate the identifier of the one or more documents to a web page address;
    utilizing the update file, the identifier of the one or more documents associated with the modified content, and the position of the modified content to update the in-memory index; and
  wherein the in-memory index maintains a record of modifications to the one or more documents associated with an inverted index; and
  an index-file manager that serves a set of query results in response to a user query utilizing query results from both the in-memory index and the inverted index, wherein the index-file manager merges query results from the in-memory index and the inverted index to generate the set of query results served in response to the user query.

11. The computer system of claim 10, wherein the computer software components further comprise a network crawler to express the indication of the modification upon performing the following procedures:
  crawling the one or more documents within a predetermined scope of websites; and
  detecting an adjustment to metadata underlying the content of the one or more documents.

12. The computer system of claim 10, wherein the index file manager is further configured to prioritize query results from the in-memory index over corresponding query results from the inverted index.

13. The computer system of claim 10, wherein the in-memory index manager is further configured to derive the identifier of the one or more documents based on a uniform resource located (URL) associated within the one or more documents, wherein the identifier is a unique description of a document within the monitored set of one or more documents associated with an inverted index.

14. The computer system of claim 13, wherein the in-memory index manager is configured to initiate the update process at pre-determined periodic time frame.

15. The computer system of claim 13, wherein the in-memory index manager is configured to initiate the update process in real-time.

16. One or more computer storage media storing computer-useable instructions that, when used by one or more computing devices, cause the one or more computing devices to perform a method comprising:
  receiving a user query;
  extracting primary query results in response to the user query from an inverted index, the inverted index located on a plurality of index serving devices, wherein the inverted index is updated by crawling a monitored set of documents within a predetermined scope of websites;

determining that an in-memory index associated with the plurality of index serving devices contains secondary query results in response to the user query, the secondary query results containing recent updates to metadata underlying the content of one or more documents covered by the inverted index, wherein the in-memory index is updated by an update process comprising:

receiving an update file that provides an indication that a modification has occurred to the content of one or more documents associated with the inverted index;

publishing the update file to in-memory index managers located on the plurality of index serving devices;

for each update file published to the in-memory index managers, determining whether each index serving device of the plurality of index serving devices contains mapping data corresponding to the update file;

for each index serving device containing mapping data corresponding to the update file, extracting from the update file a document identifier of the one or more documents associated with the modified content;

for each index serving device containing mapping data corresponding to the update file, ascertaining a position of the modified content utilizing an index object, wherein the index object maintains a structured record of a location of the content of one of the one or more documents associated with the inverted index;

referencing a mapping schedule residing on the plurality of index serving devices upon receiving the update file;

utilizing the mapping schedule to translate the document identifier of the one or more documents to a web page address;

utilizing the update file, the document identifier, and the relative position of the modified content, to update the in-memory index;

extracting the secondary query results from the in-memory index and merging the primary query results with the secondary query results; and presenting a set of query results responsive to the user query.

17. The one or more computer storage media of claim 16, wherein merging the primary query results with the secondary query results involves prioritizing the secondary query results over corresponding primary query results.

* * * * *